United States Patent [19]

Harbin

[11] Patent Number: 5,536,439
[45] Date of Patent: Jul. 16, 1996

[54] NON-ABRASIVE LINE CLEANING COMPOSITION

[75] Inventor: Raymond H. Harbin, Livonia, Mich.

[73] Assignee: Gage Products Company, Ferndale, Mich.

[21] Appl. No.: 402,913

[22] Filed: Mar. 13, 1995

[51] Int. Cl.$^6$ ............... C11D 7/06; C11D 7/26; C11D 7/50; C23D 17/00
[52] U.S. Cl. ............... 510/212; 134/38; 510/202; 510/407; 510/505; 510/506
[58] Field of Search .................. 252/158, 170, 252/DIG. 8; 134/38

[56] References Cited

U.S. PATENT DOCUMENTS

| | | | |
|---|---|---|---|
| 2,897,104 | 7/1959 | Duncan | 252/158 |
| 3,551,204 | 12/1970 | Bolger et al. | 252/158 |
| 3,954,648 | 5/1976 | Belcak et al. | 252/158 |
| 4,421,680 | 12/1983 | Shivar | 252/526 |
| 4,537,705 | 8/1985 | Mahoney et al. | 252/529 |
| 4,592,787 | 6/1986 | Johnson | 134/38 |
| 4,594,176 | 6/1986 | Mahoney et al. | 252/153 |
| 4,686,065 | 8/1987 | Bliznik et al. | 252/159 |
| 4,968,447 | 11/1990 | Dixon et al. | 252/174.23 |

*Primary Examiner*—Erin M. Harriman
*Attorney, Agent, or Firm*—Gifford, Krass, Groh, Sprinkle, Patmore, Anderson & Citkowski

[57] ABSTRACT

A cleaning composition for removing paint deposits includes, by weight, 20–80% of a solution of 2–30% of an alkali metal hydroxide dissolved in a glycol ether together with 80-20% of an organic solvent selected from the group consisting of ketones, alcohols, esters, aromatic solvents, and combinations thereof. The composition is essentially free of water and may further include thickening agents, surfactants, defoamers and colors.

8 Claims, No Drawings

NON-ABRASIVE LINE CLEANING COMPOSITION

FIELD OF THE INVENTION

This invention relates generally to methods and compositions for cleaning and in particular to methods and compositions for cleaning paint deposits from the interior of tubes, tanks, conduits and the like. Most specifically, the present invention relates to a nonaqueous, alkaline cleaning composition capable of dissolving a wide variety of paint compositions.

BACKGROUND OF THE INVENTION

Paint delivery systems utilized for the finishing of a wide variety of manufactured items such as motor vehicles, household appliances and the like are becoming increasingly more sophisticated. A typical industrial paint delivery system may comprise a central paint supply having a number of painting stations communicating therewith. Such systems can selectively deliver a variety of different paints to a given painting station and include complex fluid pathways having a number of tanks, pumps, and conduits. These paint delivery systems tend to accumulate deposits in the course of their use and such deposits can decrease, and even block, the flow of paint therethrough. The deposits are comprised of pigment, resins and other components of the paint. In addition to causing clogging, such deposits can also contaminate the paint color, and can break loose and cause surface defects in the finished, painted product. Accordingly, it is necessary to periodically clean the paint delivery system.

Because of the complexity of such systems, and because of the necessity of avoiding expensive down time, it is generally preferable that the systems be cleaned without disassembly. Typically, systems are cleaned by passing a variety of solvents, detergents or other such materials therethrough. Prior art processes usually involve numerous steps and multiple cleaning compositions; and such processes frequently do not provide full removal of deposits, particularly hardened pigment residues.

A typical prior art process can involve flushing five or more different cleaning compounds of varying polarity through the paint system and can include up to thirty separate operational steps. The numerous cleaning compounds and steps are needed in order to fully remove all deposits from the system and to insure compatibility of any traces of cleaning compounds remaining in the system with subsequently introduced paint. As a result, the system must be sequentially rinsed with various materials in a predetermined order.

Clearly, it would be desirable to have a single cleaning composition which is capable of effectively removing all deposits from a paint delivery system. It is further desirable that this single composition be capable of dissolving a variety of different paint residues, and that the composition not harm components of the paint delivery system or leave any residue which would contaminate paint when the system is subsequently put back into service.

U.S. Pat. Nos. 4,537,705 and 4,594,176 both disclose aqueous based paint stripping compositions. These compositions include an alkaline material together with a particular group of polyamines. The compositions can optionally include small amounts of accelerator compounds which may comprise glycol ethers. U.S. Pat. No. 4,421,680 discloses an aqueous based degreaser composition which includes a glycol ether, a long chain amide, a detergent, sodium metasilicate and an alkali such as potassium hydroxide. While these compounds have some utility, they are not capable of dissolving heavy deposits of the type encountered in the lines of paint delivery systems.

One prior art approach to the problem of paint line cleaning is disclosed in U.S. Pat. No. 4,968,447. Shown therein, is a paint line cleaning composition which is of relatively low viscosity and which includes an organic solvent having a particulate, polymeric material dispersed therein. The polymeric material provides a mild abrasive action which scrubs away paint residue as the liquid is pumped through the paint delivery system. While this composition efficiently removes a variety of paint deposits, there are instances in which the particulate material has been found to interfere with the mechanical operation of some components of some paint delivery systems, and there is a need for a particulate-free composition which will effectively remove a variety of paint deposits. Also, in some instances it is not possible, or practical, to pump the cleaning composition of the '447 patent through equipment which is to be cleaned, and there is therefore a further need for a cleaning composition which does not require any flow, or high degree of agitation to effect cleaning. Finally, it is essential that any cleaning composition be of low toxicity and present a minimal hazard of fire, explosion or such undesirable chemical reaction.

The present invention provides a cleaning composition which is non-abrasive and safe, and which effectively dissolves a wide variety of solvent based and water based paint deposits. The composition of the present invention has significant utility for cleaning lines, tanks, nozzles and hoses of paint delivery systems. The composition also may be utilized to clean paint residues from spray booths, conveyors and paint formulating equipment. In addition, the composition may be utilized as a paint stripper. These and other advantages of the present invention will be readily apparent from the description, discussion and examples which follow.

SUMMARY OF THE INVENTION

There is disclosed herein a cleaning composition for removing paint deposits. The composition consists essentially of, by weight, approximately 20–80% of a solution of 2–30% of an alkali metal hydroxide dissolved in a glycol ether, together with approximately 80-20% of an organic solvent selected from the group consisting of: ketones, alcohols, esters, aromatic solvents and combinations thereof. The composition is essentially free of water.

In particular embodiments, the glycol ether is an ether of propylene glycol or ethylene glycol. One particularly preferred ether comprises propylene glycol monomethyl ether. The alkali metal hydroxide is preferably sodium hydroxide or potassium hydroxide. One particularly preferred group of organic solvents comprises cyclohexanone, methyl isobutyl ketone, and aromatic solvents taken either singularly or in combination. The composition may also include ancillary ingredients such as thickeners. Thickeners may include the ester of a dibasic acid, or cellulose derivatives such as hydroxy propyl cellulose.

DETAILED DESCRIPTION OF THE INVENTION

The present invention is directed to an organic based composition having a high degree of solvating power for a broad range of solvent-based and water-based paint materials including high solids paints as well as clear coats. The cleaning composition is particularly well suited for cleaning heavily pigmented deposits such as are found in paint lines, vats and on spray booth equipment.

In the broadest sense, the present invention includes a non-aqueous mixture of a glycol ether based solution of an alkali metal hydroxide together with an organic solvent. Specifically, the hydroxide is present in a concentration of 2–30% by weight in the glycol ether, and this solution constitutes approximately 20–80% by weight of the cleaning composition. The organic solvent is typically present in a range of 80-20% by weight, and the organic solvent is generally selected from the group consisting of ketones, alcohols, esters, aromatic solvents and mixtures thereof. The composition of the present invention is non-aqueous, although it is to be understood that the composition need not be anhydrous in a strict sense. Small amounts of water may be present in the solvents or in the alkali metal hydroxide as supplied, or may be taken up from the atmosphere. Accordingly, the composition may include several percent of water as an incidental ingredient; although, the water is not an essential or significant component of the cleaning composition.

The glycol ether is preferably a relatively short chain ether, typically a lower alkyl glycol ether. Among some of the most preferred ethers are the ethers of propylene glycol and ethylene glycol. One particularly preferred ether comprises propylene glycol monomethyl ether. Another preferred material comprises ethylene glycol monobutyl ether. In some instances, polyglycol ethers such as diethylene glycol ethers, triethylene glycol ethers, dipropylene glycol ethers and tripropylene glycol ethers, especially monomethyl ethers, will have significant utility.

The most preferred alkaline metal hydroxides comprise sodium hydroxide and potassium hydroxide. Potassium hydroxide is particularly preferred because it has a high solubility in glycol ethers. Lithium hydroxide, as well as other group 1A hydroxides also function in the present invention; however, they are of lower commercial practicality because they are presently relatively costly in comparison to sodium and potassium hydroxide.

The specific organic solvent used in the present invention will depend upon the particular application, and ketones, esters and aromatic solvents are generally preferred. Cyclohexanone, methyl isobutyl ketone and isobutyl butyrate are some generally preferred solvents together with aromatic solvents such as xylenes, toluene, and other alkyl benzenes. There are a number of commercially available blends of aromatic solvents, typically comprising alkyl benzene mixtures. These blends all generally function well in the present invention, and selection of a particular blend is typically based upon price considerations as well as resultant flash point of the composition prepared therefrom. It is generally preferred that the composition have a flash point in excess of 100° C. Among some of the aromatic mixtures which may be employed in the practice of the invention are mixtures sold under the designation GP-100 by Gage Products Company of Ferndale, Mich. Another solvent having utility in the present invention is the high flash point aromatic solvent sold under the trade name Cyclosol 53 by the Shell Chemical Company.

In some instances, it is desirable to thicken the composition of the present invention. While the thickener does not directly participate in the dissolution of the paint residue, it serves to maintain contact of the composition with the painted surface. In general, thickeners are employed at a concentration of approximately 0.5–5%. There are a variety of thickening materials commercially available, and any thickener which is compatible with the organic solvent, and the alkaline metal hydroxide will function. Cellulose derivatives such as hydroxy alkyl celluloses have been found to provide thickening for compositions of the present invention. One particularly preferred thickener comprises hydroxy propyl cellulose. It has been found that the composition of the present invention can be thickened by the addition of a relatively small amount of ester of a dibasic acid. A solvent material sold by the DuPont Corporation of Wilmington, Del. under the designation dibasic ester has been found to thicken the composition of the present invention when present in approximately 1–3% by weight. Other similar materials including isobutyl isobutyrate will function in the same manner.

The compositions of the present invention may be prepared by simply mixing the components together. Preferably, the hydroxide is first dissolved in the glycol ether, and solution added to the appropriate organic blend. The dissolution of the hydroxide in the ether is relatively exothermic, and addition is carried out slowly, with stirring, and cooling if necessary. Ancillary ingredients such as thickeners, defoamers, surfactants or colorings may be added, as is well known in the art.

The present invention will best be illustrated by the following series of examples. A series of compositions were prepared and were tested on simulated paint sludge samples. The test samples were prepared by coating the interior of a series of 40 milliliter glass vials with a synthetic paint sludge prepared by mixing equal amounts, by weight, of a white, solvent-based, high solids, acrylic, monocoat enamel (DuPont 5920) with a paint pigment which comprised a fifty-fifty blend of titanium dioxide and yellow iron oxide. A 2 gram sample of the paint sludge was placed in each vial, and the vials were dried at 270° F. for 2 hours to produce highly adherent paint encrustation. The samples being tested were placed in the vial, and shaken on an oscillatory shaker at 400 RPM for 2 hours, at room temperature. The vials were visually inspected, and a subjective assessment made of the cleaning action of the compositions. In the examples, as in the rest of the specification and claims, all percentages are by weight.

Example 1

This cleaning composition was prepared from equal parts of a 20% solution of potassium hydroxide in propylene glycol monomethyl ether; methyl isobutyl ketone and an aromatic solvent blend sold under the designation GP-100 by Gage Products Company of Ferndale, Mich. This composition was highly effective in removing the simulated paint deposits under the test conditions detailed hereinabove.

Comparative Example 2

The composition of experiment 1 was duplicated, except that the potassium hydroxide was omitted from the glycol ether. Upon testing, this composition was found to be completely ineffective in removing the paint film.

Example 3

This composition was identical to that of Example 1, except that xylene was substituted for the GP-100. This mixture was found to have a cleaning ability generally similar to that of the mixture of Example 1.

Example 4

A composition of this example was prepared by diluting the material of Example 1 with a like amount of propylene glycol monomethyl ether which had no further potassium hydroxide dissolved therein. This compositions was also found to be an effective paint deposit remover.

Example 5

This composition was prepared by adding approximately 1.5%, by weight, of dibasic ester to the composition of Example 1. This addition produced a thickened material having a viscosity of approximately 1,500 centipoise. The cleaning ability of this composition was generally similar to that of Example 1.

Example 6

This composition comprised 25% of a 10% solution of potassium hydroxide in propylene glycol monomethyl ether; 37.5% methyl isobutyl ketone; 10% isobutylisobutyrate; 7.5% xylene and 20% dibasic ester. This produced a thickened mixture having very good cleaning qualities. It should be noted that the presences of the excess dibasic ester did not impair of the cleaning ability of the composition, and it is speculated that the excess dibasic ester functioned as an organic solvent.

Example 7

This composition comprised 30% of a 3% solution of potassium hydroxide in propylene glycol monomethyl ether; 35% methyl isobutyl ketone and 35% xylene. This composition produced a good cleaning action.

Example 8

This composition was identical to that of Example 7, except that SC-100 was substituted for the xylene. The performance of this composition was generally similar to that of Experiment 7.

Example 9

This composition was generally similar to that of Example 8, except that 2% by weight of sodium hydroxide was substituted for the potassium hydroxide. The performance of this composition was generally similar that of Experiment 8.

Example 10

This composition was generally similar to that of Experiment 7 except that 4% by weight of lithium hydroxide was substituted for the potassium hydroxide. The performance of this composition was generally similar to that of Experiment 7.

Example 11

This composition comprised 52% of a 10% solution of potassium hydroxide in propylene glycol monomethyl ether and 48% of cyclohexanone. This composition provided excellent residue removal.

Example 12

This composition comprised 52% of a 10% solution of potassium hydroxide in ethylene glycol monobutyl ether and 48% methyl isobutyl ketone. This composition provided excellent paint residue removal.

Comparative Example 13

This composition comprised a 10% solution of potassium hydroxide in ethylene glycol. This composition was very poor at removing the paint residue, with dissolution proceeding very slowly.

Comparative Example 14

This composition comprised a 10% solution of potassium hydroxide in isopropyl alcohol and it was completely ineffective in removing the paint residue.

Comparative Example 15

This composition comprised a 10% solution of potassium hydroxide in propylene glycol. Performance of this composition was poor in removing the paint residue, and dissolution proceeded very slowly.

Comparative Example 16

This composition comprised a 10% solution of potassium hydroxide in Neosol, an ethanol based solvent sold by the Shell Oil Company. This composition was ineffective in removing the paint residue.

Experiment 17

This composition comprised 25% of a 10% solution of potassium hydroxide in propylene glycol monomethyl ether; 50% cyclohexanone and 25% methyl isobutyl ketone. Performance of this composition was good in removing the paint residue.

Example 18

This composition comprised 50% of a 10% solution of potassium hydroxide in propylene glycol monomethyl ether and 50% cyclohexanone. This composition was tested against particles of a very heavy paint system encrustation obtained from the Wixom, Mich. plant of the Ford Motor Company. The composition was placed in a vial, together with a number of particles of the encrusted material, of approximately 3–5 millimeters in diameter, and shaken as in the foregoing. It was found that the composition completely dissolved the encrustation.

Comparative Example 19

A composition of 50% propylene glycol monomethyl ether and 50% cyclohexanone was prepared and tested as in Example 18. It was found that the encrustation was not dissolved by the composition, even after standing for 24 hours.

It will be appreciated from the foregoing, that a cleaning composition having excellent properties for removing a variety of paint residues may be prepared from a glycol ether-based solution of an alkali metal hydroxide together with another organic solvent. The specific components of the composition will depend upon particular applications and factors such as desired flash point, compatibility with handling and processing equipment and the like. In general, propylene or ethylene glycol ethers are favored, particularly propylene glycol monomethyl ether and ethylene glycol monobutyl ether. The organic solvents will typically comprise ketones, alcohols, esters and aromatic solvents, and most preferably include cyclohexanone, methyl isobutyl ketone, isobutyl isobutyrate, xylene and various aromatic blends.

The foregoing discussion and examples are merely meant to illustrate particular embodiments of the invention, and are not meant to be limitations upon the practice thereof. It is the following claims, including all equivalents, which define the scope of the invention.

I claim:

1. A cleaning composition for removing paint deposits, said composition consisting essentially of, by weight:
   20–80% of a solution of 2–30% of an alkali metal hydroxide dissolved in a glycol ether selected from the group consisting of an ether of propylene glycol and an ether of ethylene glycol;
   80-20of an organic solvent selected from the group consisting of: cyclohexanone, methyl isobutyl ketone, isobutyl isobutyrate, xylene, toluene and mixtures thereof;
   said composition being essentially free of water.

2. A composition as in claim 2, wherein said ether is a monomethyl ether.

3. A composition as in claim 1, wherein said glycol ether is propylene glycol monomethyl ethyl.

4. A composition as in claim 1, wherein said alkali metal hydroxide is potassium hydroxide.

5. A cleaning composition as in claim 1, further including 0.5–5% by weight of a thickening agent.

6. A composition as in claim 5, wherein said thickening agent is an ester of a dibasic acid.

7. A composition as in claim 5, wherein said thickening agent is a cellulose ether.

8. A cleaning composition for removing paint deposits, said composition consisting essentially of, by weight:
   20–80% of a solution of 2–30% of potassium hydroxide dissolved in propylene glycol monomethyl ether;
   80-20% of an organic solvent selected from the group consisting of: cyclohexanone, methyl isobutyl ketone, isobutyl butyrate, aromatic solvents and mixtures thereof;
   said composition being essentially free of water.

* * * * *

UNITED STATES PATENT AND TRADEMARK OFFICE
CERTIFICATE OF CORRECTION

PATENT NO. : 5,536,439
DATED : July 16, 1996
INVENTOR(S) : Raymond H. Harbin

It is certified that error appears in the above-indentified patent and that said Letters Patent is hereby corrected as shown below:

Column 7, line 20, delete "80-20of" and insert --80-20% of--.

Column 8, line 1, delete "2" and insert --1--.

Signed and Sealed this

Fifteenth Day of April, 1997

Attest:

BRUCE LEHMAN

Attesting Officer      *Commissioner of Patents and Trademarks*